United States Patent
Kohara

(10) Patent No.: US 9,039,399 B2
(45) Date of Patent: May 26, 2015

(54) RIGID CORE FOR FORMING TIRE

(71) Applicant: SUMITOMO RUBBER INDUSTRIES, LTD., Kobe-shi, Hyogo (JP)

(72) Inventor: Kei Kohara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 14/379,142

(22) PCT Filed: Jan. 15, 2013

(86) PCT No.: PCT/JP2013/050546
§ 371 (c)(1),
(2) Date: Aug. 15, 2014

(87) PCT Pub. No.: WO2013/132884
PCT Pub. Date: Sep. 12, 2013

(65) Prior Publication Data
US 2015/0030711 A1    Jan. 29, 2015

(30) Foreign Application Priority Data
Mar. 7, 2012    (JP) ................................. 2012-050744

(51) Int. Cl.
*B29C 33/76*    (2006.01)
*B29D 30/06*    (2006.01)

(52) U.S. Cl.
CPC .................................. *B29D 30/0661* (2013.01)

(58) Field of Classification Search
CPC ..... B29D 30/12; B29D 30/0661; B29C 33/76
USPC ................................ 425/54, 55; 156/414, 417
See application file for complete search history.

(56) References Cited

U.S. PATENT DOCUMENTS

| | | | |
|---|---|---|---|
| 1,366,750 A * | 1/1921 | Smith et al. ...................... | 425/56 |
| 2007/0023967 A1 | 2/2007 | Cordaillat et al. | |
| 2007/0125496 A1 | 6/2007 | Lundell et al. | |

FOREIGN PATENT DOCUMENTS

| | | | |
|---|---|---|---|
| JP | 2003-340824 A | 12/2003 | |
| JP | 2006-117115 A | 5/2006 | |

(Continued)

OTHER PUBLICATIONS

International Search Report, mailed Apr. 16, 2013, issued in PCT/JP2013/050546.

*Primary Examiner* — James Mackey
(74) *Attorney, Agent, or Firm* — Birch, Stewart, Kolasch & Birch, LLP

(57) ABSTRACT

Provided is a rigid core for forming a tire, configured so that the intrusion of rubber into a gap between core segments is prevented and so that the lowering of roundness of a core body s prevented. The core body comprises a plurality of circumferentially divided core segments. Both circumferential end surfaces of each of the core segments are used as mating surfaces, and the mating surfaces adjacent to each other in the circumferential direction are abutted against each other to form the core body. At least one of the mating surfaces adjacent to each other in the circumferential direction is formed as a stepped mating surface comprising a bordering surface region extending along an outer circumferential edge of the mating surface, and a recessed surface region surrounded by the bordering surface region and recessed in a step shape from the bordering surface region so that only the bordering surface region contacts with the adjacent mating surface.

4 Claims, 7 Drawing Sheets

(56) References Cited

FOREIGN PATENT DOCUMENTS

| JP | 2006-347177 A | 12/2006 |
| JP | 2007-152957 A | 6/2007 |
| JP | 2011-161896 A | 8/2011 |
| JP | 2011-167979 A | 9/2011 |

* cited by examiner

RIGID CORE FOR FORMING TIRE

TECHNICAL FIELD

The present invention relates to a rigid core for forming a tire which is capable of preventing intrusion of rubber into a gap between core segments, and preventing lowering of roundness of a core body during vulcanization, by improving mating surfaces of core segments.

BACKGROUND ART

Recently, a method for forming a tire using a rigid core has been proposed to enhance accuracy in forming the tire (refer to, for example, patent documents 1 and 2). The rigid core includes a core body having an external shape corresponding to a shape of a tire inner cavity surface of the tire after being subjected to vulcanization. Tire structural members are sequentially stuck onto the core body so as to form a green tire. The green tire, together with the rigid core, is then put into a vulcanization mold. And, the green tire is vulcanization-molded while being held between the core body as an inner mold and the vulcanization mold as an outer mold.

As shown in FIG. 8(A), the core body (a) is composed of a plurality of circumferentially divided core segments (c) so as to be disassembled and removed from the tire after the vulcanization molding. Using both circumferential end surfaces of each of the core segments (c) as mating surfaces (cs), the mating surfaces (cs) adjacent to each other in the circumferential direction are abutted against each other, and thereby the core body in an annular shape is formed.

As shown in FIG. 8(B), the mating surface (cs) of a conventional core segment (c) is formed in a planar shape. The mating surface (cs) is constructed so that its entirety contacts with the adjacent mating surface (cs). Therefore, effect of the flatness of the mating surface (cs) is increased, causing problems such that roundness of the core body (a) is lowered. And a gap is formed between the mating surfaces (cs) and intrusion of rubber is occurred.

In particular, the core body (a) is subjected to a temperature rise from a normal temperature state during the formation of the green tire (approximately 15 to 50 degrees C.) to a high temperature state during the vulcanization molding (100 degrees C. or above). Further, a circumferential length of a tread region is longer than a circumferential length of a bead region. Consequently, a tread side is subject to a large amount of thermal expansion, and a bead side is subject to a small amount of thermal expansion. Therefore, the mating surfaces (cs) during the vulcanization may be complicatedly deformed in an undulating shape, resulting in significant deterioration of the flatness. This can increase the number of regions including a gap between the mating surfaces (cs), and can also enlarge the gap between the mating surfaces (cs) during the vulcanization. Hence there has been the problem that the intrusion of rubber becomes more severe and pressing force between the core segments (c) becomes uneven, and therefore the roundness of the core body (a) is apt to deteriorate.

Patent document 1: Japanese unexamined Patent Application No. 2011-161896.

Patent document 2: Japanese Unexamined Patent Application No. 2011-167979.

DISCLOSURE OF THE INVENTION

Problems to be Solved by the Invention

It is an object of the present invention to provide a rigid core for forming a tire which is capable of effectively suppressing the occurrence of rubber intrusion during vulcanization and the deterioration of roundness of the core body during the vulcanization, based on a configuration that at least one of mating surfaces adjacent to each other is formed as a stepped mating surface including a bordering surface region extending along an outer circumferential edge, and a recessed surface region being recessed in a step shape from the bordering surface region.

Means of Solving the Problems

To solve the above-mentioned problems, the present invention of claim 1 relates to a rigid core for forming a tire which comprises an annular core body provided in its outer surface with a tire molding surface region for forming a green tire and which is for subject the green tire to vulcanization molding between a vulcanization mold and the core body by being put into the vulcanization mold together with the green tire, characterized in that the core body comprises a plurality of circumferentially divided core segments, both circumferential end surfaces of each of the core segments are used as mating surfaces, and the mating surfaces adjacent to each other in the circumferential direction are abutted against each other to form the core body, and at least one of the mating surfaces adjacent to each other in the circumferential direction is formed as a stepped mating surface comprising a bordering surface region extending along an outer circumferential edge of the mating surface, and a recessed surface region surrounded by the bordering surface region and recessed in a step shape from the bordering surface region so that only the bordering surface region contacts with the adjacent mating surface.

In claim 2, the rigid core for forming a tire is characterized in that the bordering surface region measures 5 to 35 mm in width w from the outer circumferential edge.

In claim 3, the rigid core for forming a tire is characterized in that the recessed surface region measures 0.05 to 1.0 mm in depth H from the bordering surface region.

Effects of the Invention

In the present invention, as descried above, at least one of the mating surfaces adjacent to each other in the circumferential direction is formed as the stepped mating surface comprising the bordering surface region extending along the outer circumferential edge of the mating surface, and the recessed surface region being recessed in a step shape from the bordering surface region. Therefore, in the assembled state of the core segments, the mating surfaces contact with each other only in the bordering surface region. Consequently, when compared with the contact occurring over the entirety of the mating surface, the effect of the flatness is decreased, and the matching between the mating surfaces can be improved. Particularly, when a complicated deformation occurs in the mating surface due to thermal expansion, adverse effect thereof can be absorbed by the recessed surface region and thereby it becomes possible to obtain a good matching between the matching surfaces. Accordingly, the rigid core of the present invention ensures effective suppression of the occurrence of rubber intrusion during the vulcanization and the deterioration of the roundness of the core body during the vulcanization.

Figure 1:
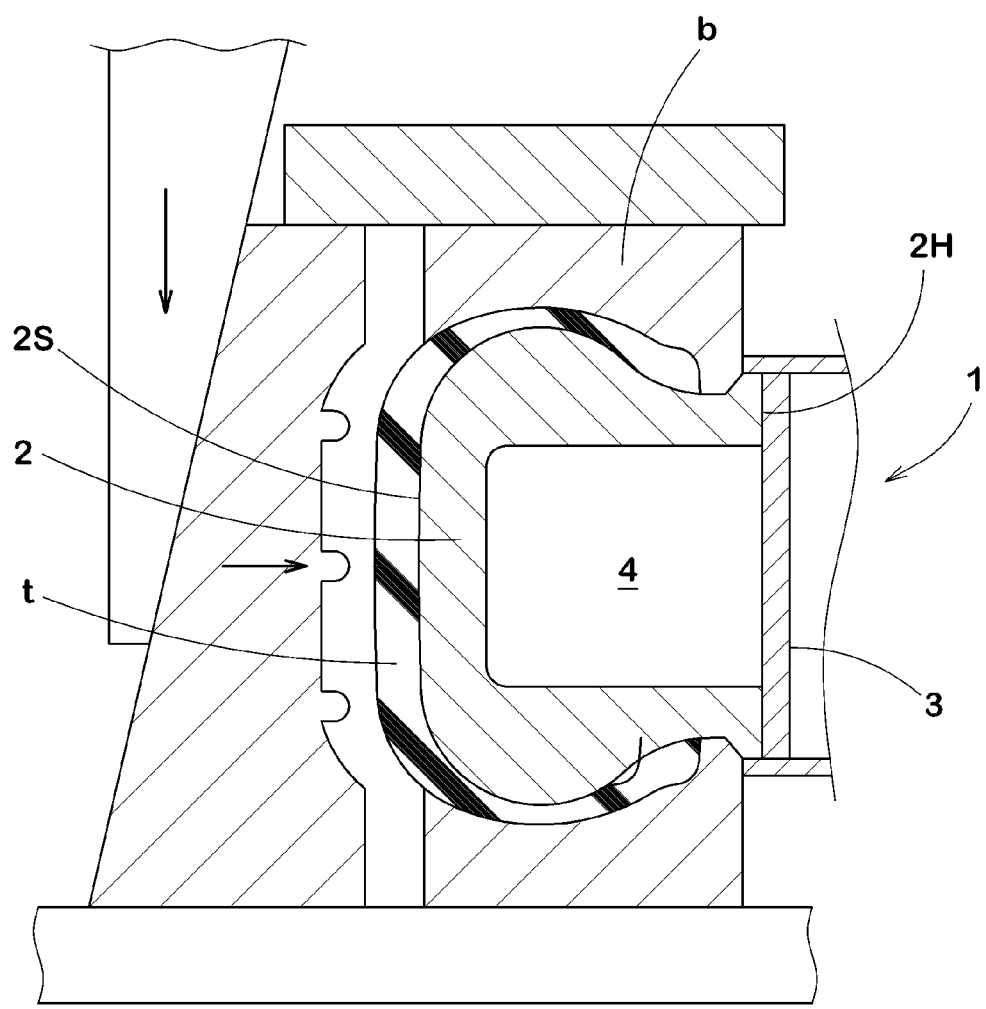
FIG. 1 is a cross-sectional view showing a use state of an embodiment of a rigid core of the present invention.

DESCRIPTION OF THE REFERENCE NUMERAL 1 rigid core
2 core body
2s tire molding surface region
5 core segment
6 mating surface
6e outer circumferential edge
7 bordering surface region
8 recessed surface region
9 stepped mating surface
b vulcanization mold
t green tire

MODE FOR CARRYING OUT THE INVENTION

An embodiment of the present invention is described in detail below.

As shown in FIG. 1, a rigid core 1 of the present embodiment includes an annular core body 2 provided in its outer surface with a tire molding surface region 2s. Tire structural members, such as a carcass ply, a belt ply, a sidewall rubber, and a tread rubber, are sequentially stuck one upon another on the tire molding surface region 2s so as to form a green tire (t) having approximately the same shape as a finished tire. The vulcanization molding is carried out by putting the green tire (t) into a vulcanization mold (b) together with the rigid core 1 as usual, and then by heating and pressurizing the green tire (t) between the core body 2 as an inner mold and the vulcanization mold (b) as an outer mold. The tire molding surface region 2s is to be formed in approximately the same shape as an inner surface shape of the finished tire.

The rigid core 1 includes the annular core body 2 and a circular cylindrical core 3 to be internally inserted into a center hole 2H of the annular core body 2. Any well-known structures are properly applicable to configurations other than that of the core body 2. Therefore, the following description is given only of the core body 2.

The core body 2 of the present embodiment is formed in a hollow shape having therein an inner cavity region 4 continuously extending in a circumferential direction. Heating means (not shown) for heating the green tire (t) from the inside, such as an electric heater, is disposed in the inner cavity region 4.

Figure 2:
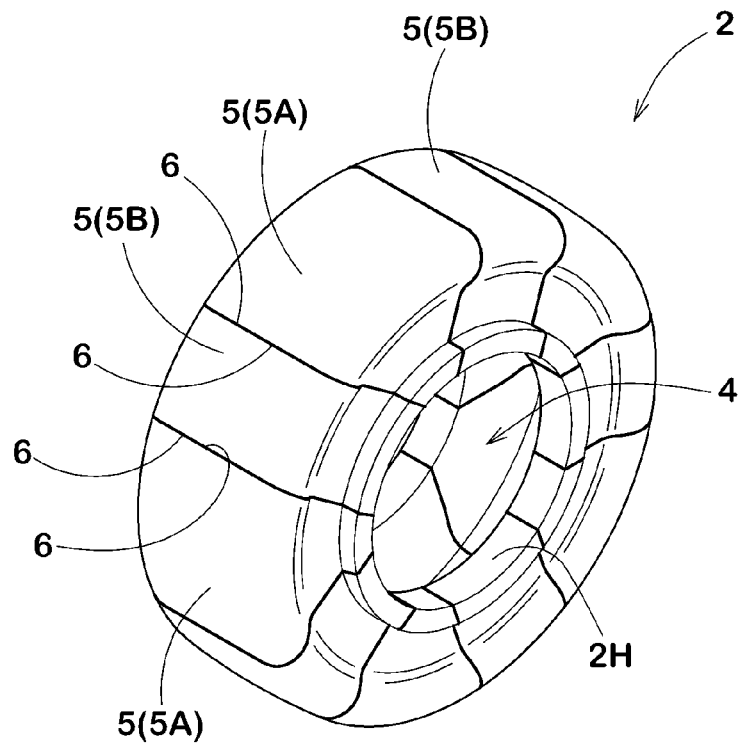
FIG. 2 is a perspective view of a core body.
Figure 3:
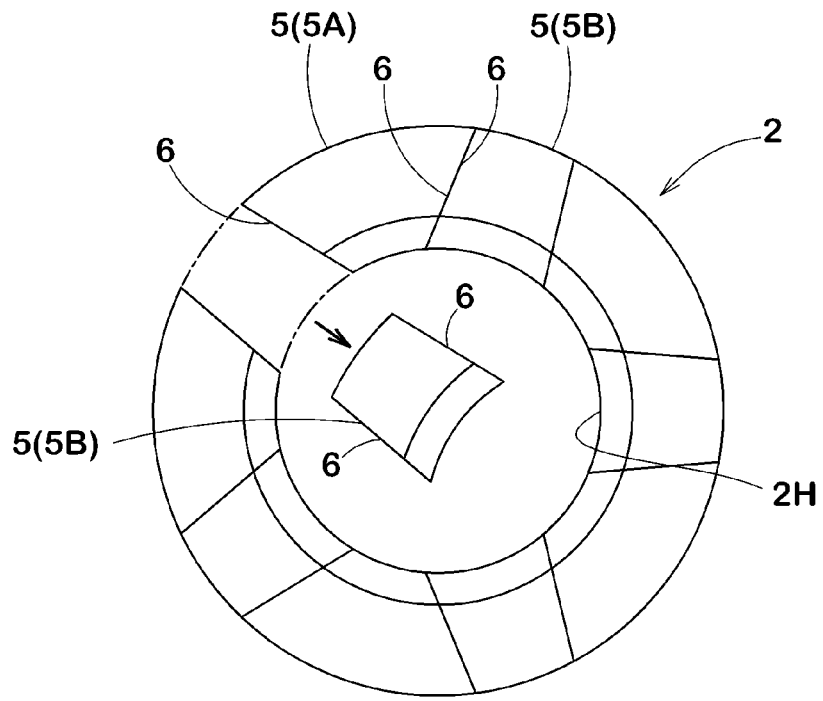
FIG. 3 is a side view of the core body.

As shown in FIGS. 2 and 3, the core body 2 is composed of a plurality of circumferentially divided core segments 5. Using both circumferential end surfaces 5 of each core segment 5 as mating surfaces 6, the mating surfaces 6 adjacent to each other in the circumferential direction are abutted against each other and thereby the annular core body 2 is formed.

In the present embodiment, the core segment 5 is made up of first and second core segments 5A and 5B disposed alternately in the circumferential direction. In the first core segment 5A, the mating surfaces 6 on both ends in the circumferential direction are inclined radially inward in a direction to decrease a circumferential width of the mating surfaces 6. In the second core segment 5B, the mating surfaces 6 on both ends in the circumferential direction are inclined radially inward in a direction to increase the circumferential width of the mating surfaces 6. This ensures that the core segments 5 are sequentially removable radially inward from the second core segment 5B so as to be sequentially unloaded from a bead hole of the finished tire after the vulcanization molding. The core 3 (shown in FIG. 1) inhibits a radially inward movement of the core segments 5 so as to integrally couple the core segments 5 to each other.

Figure 4A:
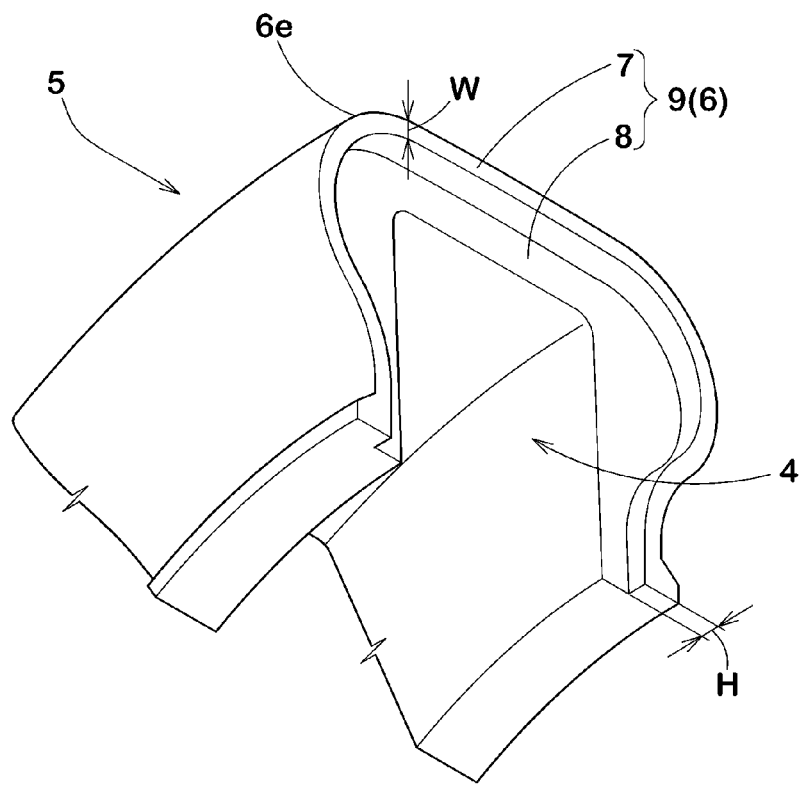
FIG. 4(A) is a perspective view of a core segment showing a stepped mating surface.
Figure 4B:
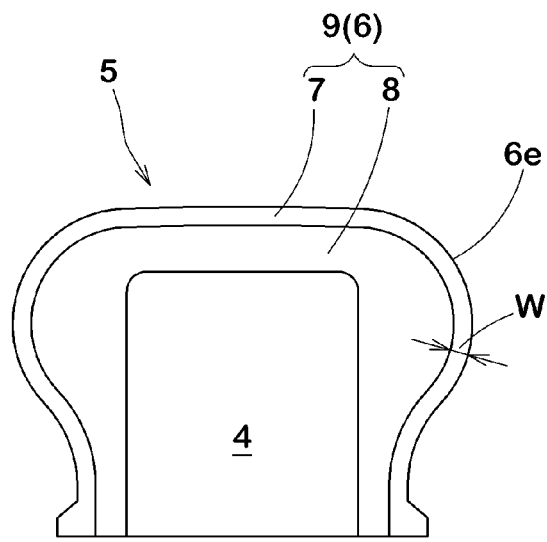
FIG. 4(B) is a front view of the stepped mating surface.
Figure 5:
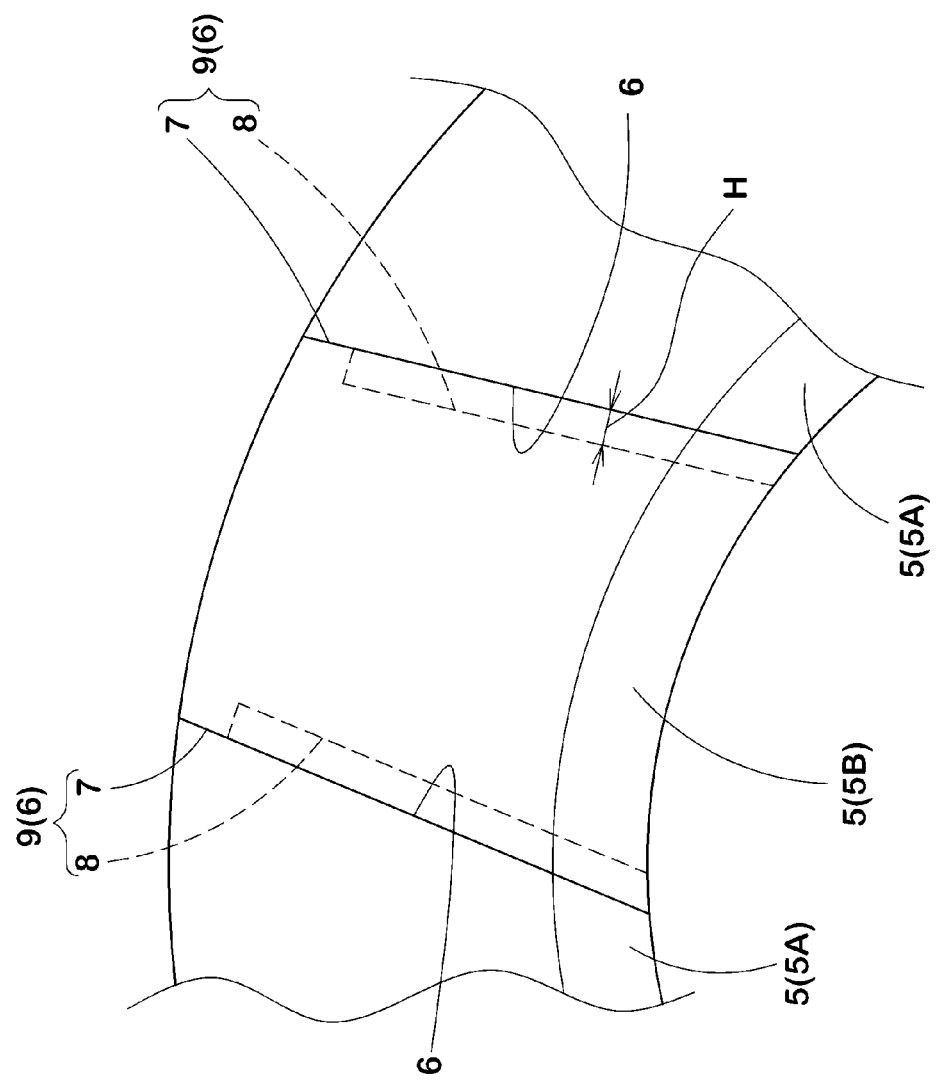
FIG. 5 is a side view showing in enlarged dimension an abutted state using the stepped mating surfaces.

In the present invention, as shown in FIGS. 4(A) and 4(B), at least one of the mating surfaces 6 and 6 adjacent to each other in the circumferential direction is formed as a stepped mating surface 9 comprising a bordering surface region 7 extending along an outer circumferential edge (6e) of the mating surface 6, and a recessed surface region 8 surrounded by the bordering surface region 7 and recessed in a step shape from the bordering surface region 7. Thereby, the stepped mating surface 9 can contact with the adjacent mating surface 6 only in the bordering surface region 7 as shown in FIG. 5.

Therefore, in the stepped mating surface 9, even when the mating surfaces 6 of the core segments 5 adjacent to each other are complicatedly deformed due to thermal expansion, the recessed surface region 8 remains noncontacted, thus ensuring high consistency between the mating surfaces 6 and 6. Accordingly, the rigid core 1 of the present invention is capable of effectively suppressing the occurrence of rubber intrusion during the vulcanization and the deterioration of roundness of the core body during the vulcanization.

For that purpose, it is preferable that the bordering surface region 7 measures 5 to 35 mm in width w from the outer circumferential edge (6e). If the width w of the bordering surface region 7 becomes more than 35 mm, then as the contact area is wide, it becomes difficult to ensure the matching, and the effect to prevent the rubber intrusion and the lowering of the roundness is decreased. On the other hand, if the width w of the bordering surface region 7 becomes less than 5 mm, then as the strength of the bordering surface region 7 is lowered and the pressure exerted on the bordering surface region 7 is relatively increased. Therefore, durability is decreased, and the bordering surface region 7 undergoes deformation and damage in repeated use.

In the recessed surface region 8, it is also preferable that the recessed surface region 8 measures 0.05 to 1.0 mm in depth H from the bordering surface region 7. If less than 0.05 mm, it becomes difficult to sufficiently eliminate the deformation of the mating surfaces 6 due to the thermal expansion, thus it becomes difficult to ensure the good matching. On the other hand, if more than 1.0 mm, the strength of the bordering surface region 7 is decreased, and durability is decreased, thus the bordering surface region 7 is liable to undergo deformation and damage in repeated use.

Although it is more preferable that the width w and the depth H of the bordering surface region 7 are constant, both may not be constant. In such a case, it is preferable that upper limit values and lower limit values therefore fall within the above-mentioned range of 5 to 35 mm and range of 0.05 to 1.0 mm.

When the width w and the depth H of the bordering surface region 7 fall within the above ranges, the suppression effects in the rubber intrusion and the lowering of the roundness increase with decreasing a ratio s1/s2 of an area s1 of the bordering surface region 7 and a profile area s2 of the mating surface 6. From the viewpoint of improving the suppression effects, therefore, it is preferable that the ratio s1/s2 is not more than 55%, more preferably not more than 35%. The profile area s2 means an area surrounded by a contour line (outer circumferential edge) of the mating surface 6.

The stepped mating surface 9 needs to be formed on at least one of the mating surfaces 6 and 6 adjacent to each other in the circumferential direction. Alternatively, the stepped mating surface 9 may be formed according to the following aspects (A) to (D).

Figure 6A:
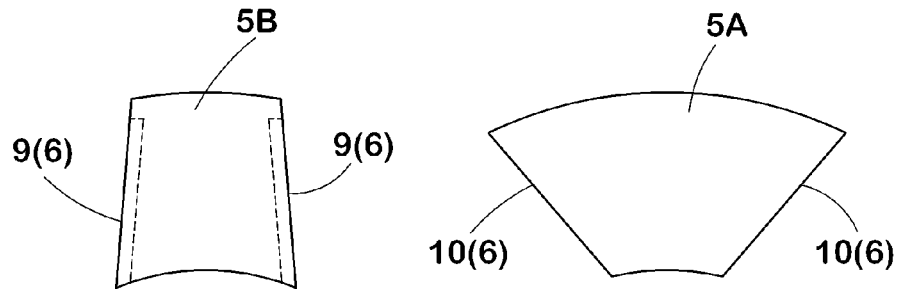
FIGS. 6(A) to 6(D) are schematic views, each showing a combination of the stepped mating surfaces.

(A) As shown in FIG. 6(A), the mating surfaces 6 and 6 of the second core segment 5B are respectively formed as the stepped mating surface 9, and the mating surfaces 6 and 6 of the first core segment 5A are respectively formed as a conventional smooth mating surface 10 without the recessed surface region 8.

Figure 6B:
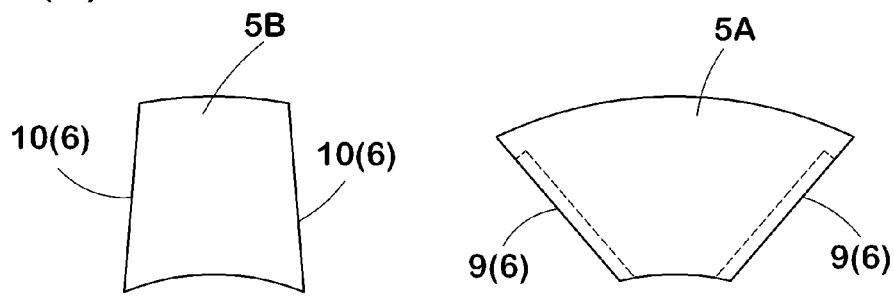

(B) As shown in FIG. 6(B), the mating surfaces 6 and 6 of the second core segment 5B are respectively formed as the smooth mating surface 10, and the mating surfaces 6 and 6 of the first core segment 5A are respectively formed as the stepped mating surface 9.

Figure 6C:
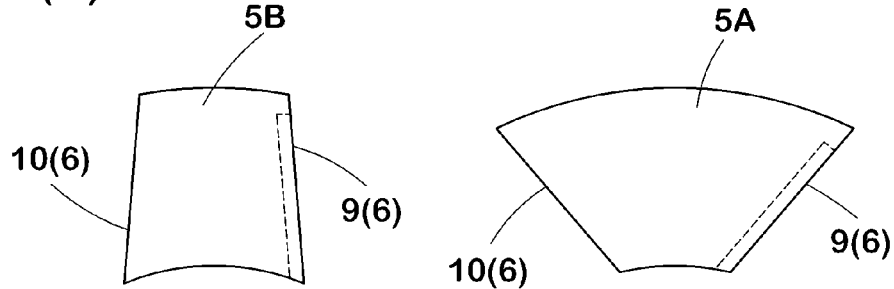

(C) As shown in FIG. 6(C), only one of the mating surfaces 6 and 6 on one direction side in the circumferential direction (the right side in the present aspect) in the first and second core segments 5A and 5B is formed as the stepped mating surface 9.

Figure 6D:
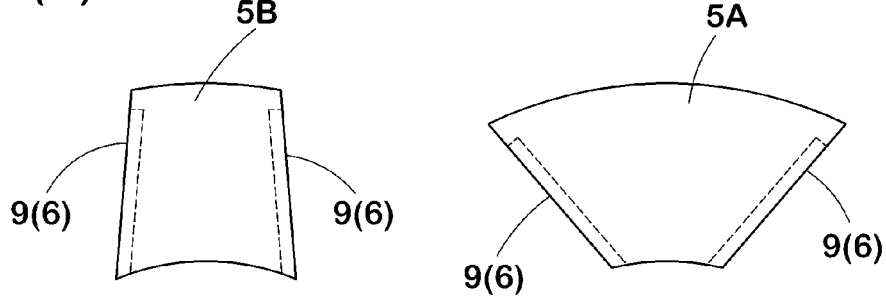

(D) As shown in FIG. 6(D), the mating surfaces 6 and 6 of the first and second core segments 5A and 5B are respectively formed as the stepped mating surface 9.

Figure 7A:
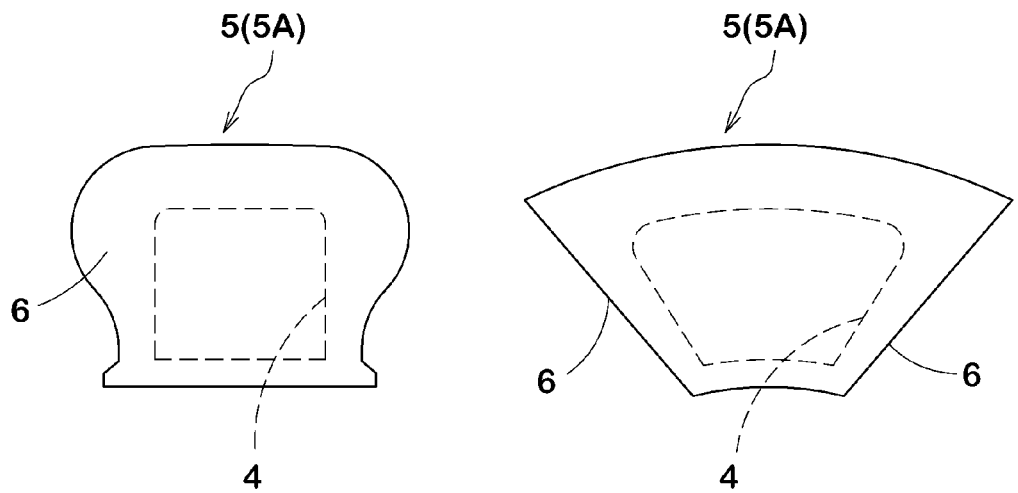
FIGS. 7(A) and 7(B) are schematic views, each showing a state of an inner cavity region of the core segments presented in Table 1.

As shown in FIG. 7(A), the inner cavity region 4 in the core body 2 is confined in each of the core segments 5 so as to be formed without being communicated with the mating surface 10. In this case, a heated fluid, such as steam, can be employed as heating means. The heated fluid is to flow into the individual inner cavity regions 4 so as to heat the green tire (t) from inside with the core body 2 interposed therebetween.

Although the particularly preferred embodiment of the present invention has been described in detail, the present invention can be modified and carried out in various embodiments without being limited to the illustrated embodiment.

EXAMPLES

To confirm the effects of the present invention, core bodies for forming a pneumatic tire of a tire size 195/65R15 were produced experimentally based on specifications presented in Table 1. Then, evaluations were conducted on rubber intrusion resistance and the roundness of the core bodies upon production of the pneumatic tire using each of the core bodies.

Each of the core bodies is made of an aluminum (coefficient of thermal expansion=$23.1 \times 10^{-6}$/degrees C.), and divided into ten core segments. In a normal temperature state (20 degrees C.) of the core body, a green tire is formed, and the core body is heated to a high temperature state of 150 degrees C. in the vulcanization mold. Specifications other than shown in Table 1 are substantially the same, and the width w and the depth H of the bordering surface region are kept constant.

(1) Rubber Intrusion Resistance

After vulcanization molding, an amount of rubber corresponding to rubber intrusion occurred between the core segments was measured and evaluated by a 10-point method. That is, a large value indicates less rubber intrusion, resulting in excellent rubber intrusion resistance. The evaluation of the rubber intrusion resistance was conducted in the first, 300th, 600th, and 1000th vulcanization molding in order to also evaluate a change in the rubber intrusion resistance with increasing the number of the vulcanization molding.

(2) Roundness of Core Body

The core body was slowly rotated around an axis thereof so as to measure variations in irregularities on the outer circumferential surface of the core body at an equatorial position by using a dial gauge, and a measurement result was evaluated by the 10-point method. That is, a large value indicates less variations in the irregularities, resulting in excellent accuracy of roundness. The roundness was measured in the first, 300th, 600th, and 1000th vulcanization molding in order to also evaluate a change in roundness with increasing the number of the vulcanization molding. For example, the 600th roundness denotes the roundness of the core body measured when, upon termination of the 600th vulcanization, the segments were unloaded from the tire and the rigid core was reassembled at normal temperature.

TABLE 1

Figure 7B:
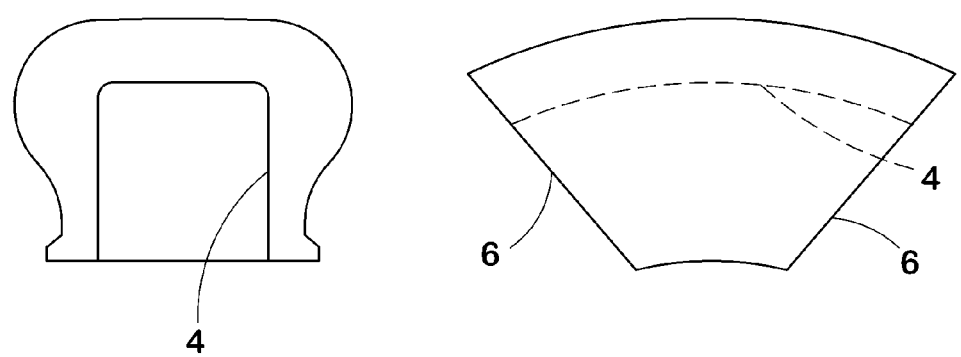
Figure 8A:
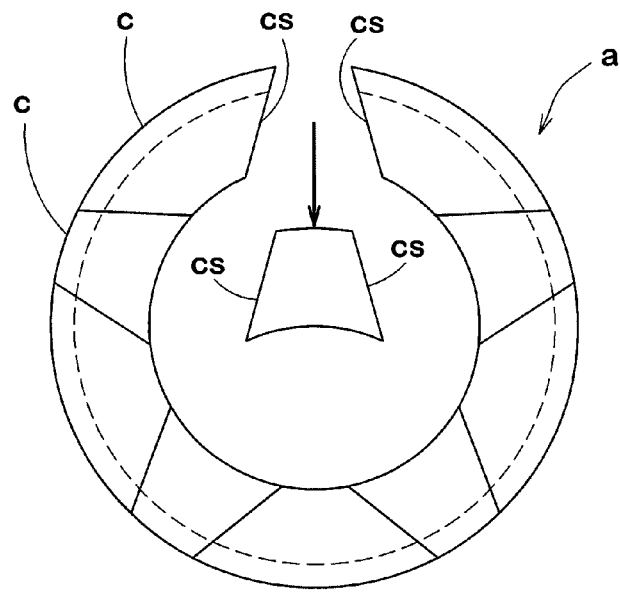
FIG. 8 (A) is a side view of a core body.
FIG. 8(B) is a perspective view of the core segment.
Figure 8B:
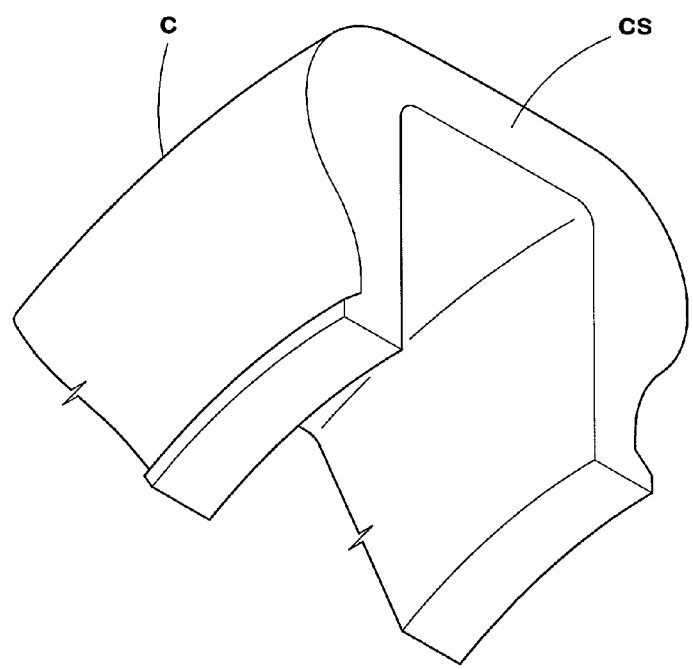

| | Comp. Ex. 1 | Comp. Ex. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| Mating Surface State | FIG. 7(A) | FIG. 7(B) | FIG. 7(A) | FIG. 7(A) | FIG. 7(A) | FIG. 7(A) | FIG. 7(A) | FIG. 7(A) | FIG. 7(A) | FIG. 7(B) | FIG. 7(B) | Present | Present | FIG. 7(A) Present | Present | Present |
| Bordering Surface Region | Absent | | | | | | Present | | | | | | | | | |
| Width w (mm) | — | — | 15 | 15 | 15 | 5 | 10 | 30 | 35 | 5 | 35 | | | 15 | | |
| Area Ratio S1/S2 (%) | — | — | 27 | 27 | 27 | 9.5 | 18.5 | 50 | 57 | 9.5 | 57 | | | 10 | | |
| Depth H (mm) | — | — | | | | | 0.2 | | | | | 0.2 | 0.05 | 0.1 | 0.8 | 1.0 |
| Mating Surface Pattern | — | — | FIG. 6(A) | FIG. 6(C) | | | FIG.6(B) | | | | | | | FIG. 6(B) | | |
| Evaluation Results First Evaluation | | | | | | | | | | | | | | | | |
| Rubber Intrusion Resistance | 9 | 9 | 10 | 10 | 10 | 10 | 10 | 10 | 9.5 | 10 | 9.5 | 10 | 9.5 | 10 | 10 | 10 |
| Roundness | 9 | 9 | 10 | 10 | 10 | 10 | 10 | 10 | 9.5 | 10 | 9.5 | 10 | 9.5 | 10 | 10 | 10 |
| 300th Evaluation | | | | | | | | | | | | | | | | |
| Rubber Intrusion Resistance | 8 | 8 | 9.5 | 9.5 | 9.5 | 9 | 9.5 | 9.5 | 9 | 9 | 9 | 9.5 | 9 | 9 | 9 | 9 |
| Roundness | 7 | 7 | 9.5 | 9.5 | 9.5 | 9 | 9.5 | 9.5 | 8.5 | 9 | 8.5 | 9.5 | 8 | 9 | 9 | 9 |

TABLE 1-continued

|  | Comp. Ex. 1 | Comp. Ex. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|---|---|
| 600th Evaluation |  |  |  |  |  |  |  |  |  |  |  |  |  |  |  |  |
| Rubber Intrusion Resistance | 7.5 | 7.5 | 9 | 9 | 9 | 8 | 9 | 9 | 8.5 | 8 | 8.5 | 9 | 8.5 | 8.5 | 8.5 | 8 |
| Roundness | 6.5 | 6.5 | 9 | 9 | 9 | 7.5 | 9 | 9 | 8 | 7.5 | 8 | 9 | 7.5 | 8.5 | 8.5 | 7.5 |
| 1000th Evaluation |  |  |  |  |  |  |  |  |  |  |  |  |  |  |  |  |
| Rubber Intrusion Resistance | 7 | 7 | 8.5 | 8.5 | 8.5 | 7.5 | 8.5 | 8.5 | 8 | 7.5 | 8 | 8.5 | 8 | 8 | 8 | 7.5 |
| Roundness | 5.5 | 5.5 | 8.5 | 8.5 | 8.5 | 7 | 8.5 | 8.5 | 7.5 | 7 | 7.5 | 8.5 | 6.5 | 8 | 8 | 7 |

As presented in Table 1, it can be confirmed that the rigid cores of Examples employing the stepped mating surfaces as the mating surfaces are capable of enhancing the consistency between the core segments so as to improve the rubber intrusion resistance and the roundness.

It is confirmable that, as the width W was small in Example 4 and the depth H was large in Example 12, the strength of their bordering surface regions became insufficient, and the bordering surface regions were deformed during repeated use, and thereby the degree of deterioration in the resistance to intrusion of rubber and the degree of lowering of the roundness became high.

The invention claimed is:

1. A rigid core for forming a tire which comprises an annular core body provided in its outer surface with a tire molding surface region for forming a green tire and which is for subject the green tire to vulcanization molding between a vulcanization mold and the core body by being put into the vulcanization mold together with the green tire, characterized in that
  the core body comprises a plurality of circumferentially divided core segments,
  both circumferential end surfaces of each of the core segments are used as mating surfaces, and the mating surfaces adjacent to each other in the circumferential direction are abutted against each other to form the core body, and
  at least one of the mating surfaces adjacent to each other in the circumferential direction is formed as a stepped mating surface comprising a bordering surface region extending along an outer circumferential edge of the mating surface, and a recessed surface region surrounded by the bordering surface region and recessed in a step shape from the bordering surface region so that only the bordering surface region contacts with the adjacent mating surface.

2. The rigid core for forming a tire according to claim 1, which is characterized in that the bordering surface region measures 5 to 35 mm in width W from the outer circumferential edge.

3. The rigid core for forming a tire according to claim 1, which is characterized in that the recessed surface region measures 0.05 to 1.0 mm in depth H from the bordering surface region.

4. The rigid core for forming a tire according to claim 2, which is characterized in that the recessed surface region measures 0.05 to 1.0 mm in depth H from the bordering surface region.

* * * * *